US012056696B2

(12) United States Patent
Agrawal et al.

(10) Patent No.: US 12,056,696 B2
(45) Date of Patent: Aug. 6, 2024

(54) GESTURE BASED ONE-TIME PASSWORD GENERATION FOR TRANSACTIONS

(71) Applicant: INTERNATIONAL BUSINESS MACHINES CORPORATION, Armonk, NY (US)

(72) Inventors: Tushar Agrawal, West Fargo, ND (US); Martin G. Keen, Cary, NC (US); Thomas Jefferson Sandridge, Tampa, FL (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 17/661,786

(22) Filed: May 3, 2022

(65) Prior Publication Data

US 2023/0360043 A1 Nov. 9, 2023

(51) Int. Cl.
*G06Q 20/38* (2012.01)
(52) U.S. Cl.
CPC ................................. *G06Q 20/385* (2013.01)
(58) Field of Classification Search
CPC ............... G06Q 20/385; G06Q 20/321; G06Q 20/40145
See application file for complete search history.

(56) References Cited

U.S. PATENT DOCUMENTS

| | | | |
|---|---|---|---|
| 9,069,948 B2 | 6/2015 | Ahn | |
| 9,280,281 B2 | 3/2016 | Lewis | |
| 9,634,833 B2 | 4/2017 | Miller | |
| 10,223,517 B2 | 3/2019 | Kandekar | |
| 10,360,412 B2 * | 7/2019 | Herger | G06V 40/176 |
| 2017/0235308 A1 | 8/2017 | Gordon | |
| 2018/0196969 A1 | 7/2018 | Herger | |
| 2020/0204541 A1 | 6/2020 | Nair | |
| 2020/0226599 A1 | 7/2020 | Adams | |
| 2021/0089638 A1 | 3/2021 | Seiler | |
| 2022/0067744 A1 * | 3/2022 | Rodriguez Bravo | G06V 40/172 |

FOREIGN PATENT DOCUMENTS

KR 101455609 B1 * 10/2014

OTHER PUBLICATIONS

The Future of Contactless Commerce by Mark Purdy HBR 2021.*

(Continued)

*Primary Examiner* — Richard C Weisberger
(74) *Attorney, Agent, or Firm* — James Olsen

(57) ABSTRACT

Aspects of the present disclosure relate to gesture-based one-time password (OTP) authentication for transactions. Initiation of a transaction can be detected. Contextual information associated with the transaction can be received. In response to detecting the initiation of the transaction and based on the contextual information associated with the transaction, a one-time password (OTP) comprising one or more gestures to be performed by a user can be generated. A command can be transmitted to display the one or more gestures to be performed on an extended reality (XR) device worn by the user. In response to validating user performance of the one or more gestures displayed via the XR device, the transaction can be authorized.

20 Claims, 6 Drawing Sheets

(56) References Cited

OTHER PUBLICATIONS

International Journal of Human-Computer Interaction 2018, vol. 34, No. 5, 433-444 https://doi.org/10.1080/10447318.2017.1357905.*
Citation: Yeh, S.-C.; Wu, E.H.-K.; Lee, Y.-R.; Vaitheeshwari, R.; Chang, C.-W. User Experience of Virtual-Reality Interactive Interfaces.*
Will Virtual Reality Finally Breakout in 2022 (Year: 2022).*
Augmented Reality and Virtual Reality (AR & VR) Market Size is Expected to Reach USD 571.42 Billion by 2025/Valuated Reports, Feb. 13, 2020, 9 pgs, <https://www.prnewswire.com/in/news-releases/augmented-reality-and-vi...>.
Best AR Device for 2020, PaleBlue Corporate/Feb. 3, 2020/Blog. 11 pgs, <https://pale.blue/newsfeed/blog/>.
Clark et al;. "Engineering Gesture-Based Authentication Systems," in IEEE Pervasive Computing, vol. 14, No. 1, 8 pgs, , Jan.-Mar. 2015.
Demuro., "Best Mobile Payment Apps in 2022", TechRadar, Feb. 1, 2022, 15 pgs, <https//www.techradar.com/news/best-mobile-payment-app>.
Disclosed Anonymously, "A dynamic authentication method for use within an Augmented Reality headset," An IP.com Prior Art Database Technical Disclosure, IP.com No. IPCOM000238453D, 5 pgs, Date: Aug. 27, 2014.
Disclosed Anonymously, "A Method for Unlocking Using Augmented Reality," ip.com Prior Art Database Technical disclosure, IP.com No. IPCOM000251734D, 4 pgs, Nov. 30, 2017.
IBM Research—Haifa Blockchain and IoT Technologies, "IoT, Blockchanin and AI", 6 pgs, Accessed Mar. 15, 2022, <https://research.ibm.com/haifa/dept/services/wearable. shtml>.
IBM, "Mobile Experiences for Everyone", 3 pgs, Accessed Mar. 15, 2022, <https://www.ibm.com/services/ibmix/mobile/>.
Mell et al., "The NIST Definition of Cloud Computing", National Institute of Standards and Technology, Special Publication 800-145, Sep. 2011, 7 pages.
Ortiz et al., "Five Imperatives for Brands to Thrive in the New World of XR and 5G", Smarter Business, Jun. 11, 2019, 5 pgs, <https://www.ibm.com/blogs/services/2019/06/11/five-imperatives-for-br...>.

\* cited by examiner

GESTURE BASED ONE-TIME PASSWORD GENERATION FOR TRANSACTIONS

BACKGROUND

The present disclosure relates generally to the field of user authentication, and in particular, to gesture-based one-time password (OTP) authentication for transactions.

Authentication is the process of proving the identity of a computer system user. Upon authentication, the user can be granted access to one or more computing resources (e.g., a website, an account, a payment transaction, etc.). Various methods for user authentication exist, including traditional passwords, multi-factor authentication (e.g., two-factor authentication (2FA)), time-based one-time passwords (OTPs), and the like.

SUMMARY

Embodiments of the present disclosure are directed to a method, system, and computer program product for gesture-based one-time password (OTP) authentication for transactions. Initiation of a transaction can be detected. Contextual information associated with the transaction can be received. In response to detecting the initiation of the transaction and based on the contextual information associated with the transaction, a one-time password (OTP) comprising one or more gestures to be performed by a user can be generated. A command can be transmitted to display the one or more gestures to be performed on an extended reality (XR) device worn by the user. In response to validating user performance of the one or more gestures displayed via the XR device, the transaction can be authorized.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
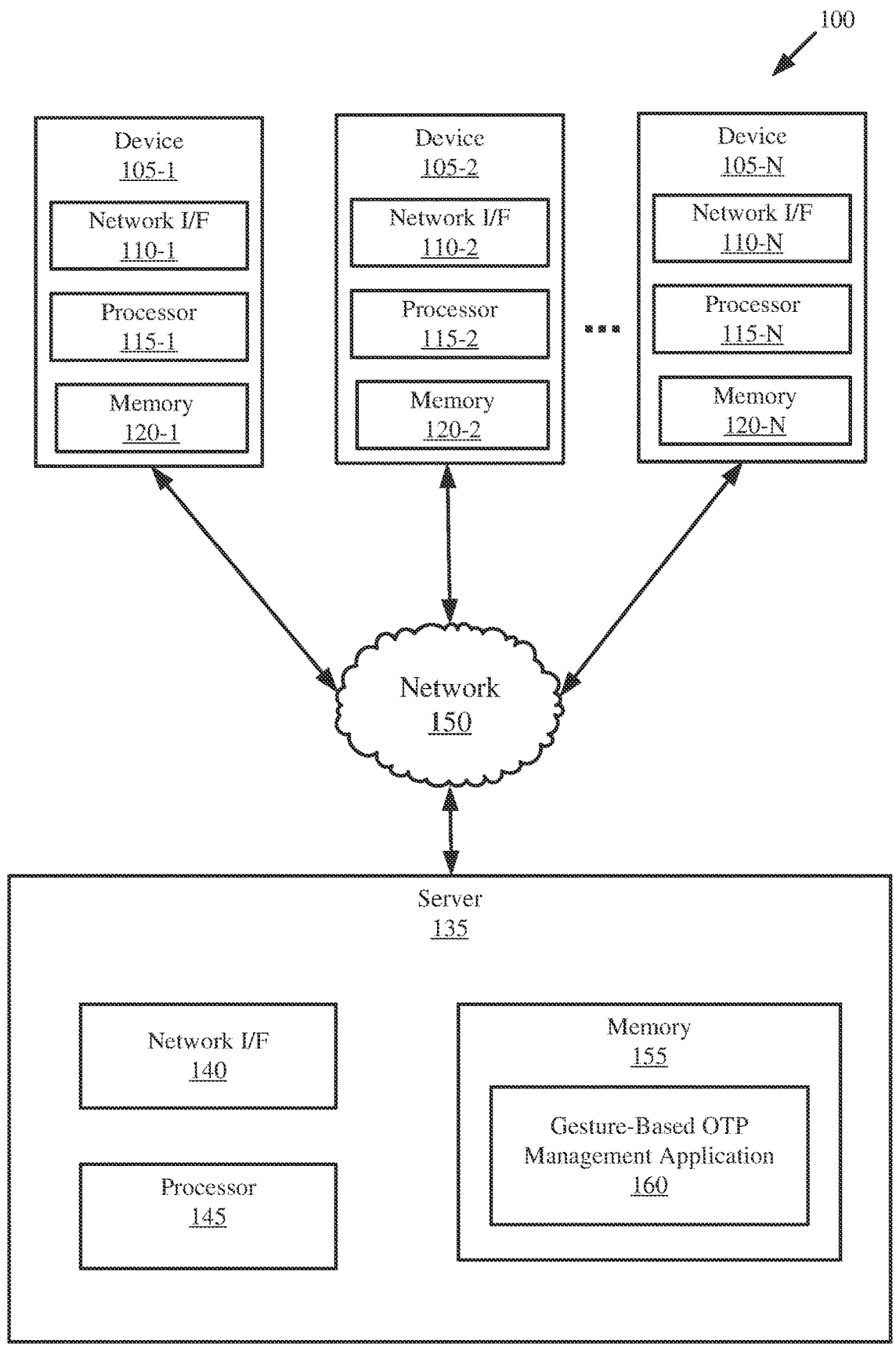
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of user authentication, and in particular, to gesture-based one-time password (OTP) authentication for transactions. While the present disclosure is not necessarily limited to such applications, various aspects of the disclosure can be appreciated through a discussion of various examples using this context.

Authentication is the process of proving the identity of a computer system user. Upon authentication, the user can be granted access to one or more computing resources (e.g., a website, an account, a payment transaction, etc.). Authentication is typically based on what a user knows (e.g., information only the user would be able to answer) or what the user has (e.g., biometrics of the user). Various methods for user authentication exist, including traditional passwords, multi-factor authentication (e.g., two-factor authentication (2FA)), time-based one-time passwords (OTP), and the like.

During certain transactions (e.g., contactless payment transactions), one-time passwords may be required to authorize the transaction within a limited time frame. For example, a user can initiate a contactless payment transaction with a near-field communication (NFC) link on a mobile device or credit card. The user can then be prompted to complete an OTP (e.g., on their mobile device), and the transaction can be authorized or denied based on the result of the authentication.

In this example, the transaction amount can be limited based on the security of the authentication mechanism (e.g., two-factor authentication may authorize a higher limit for spending than a time-based OTP). Further, the generated OTP does not consider the context of the occurring transaction (e.g., where certain circumstances may require stronger security and certain circumstances may require lesser security). Additional OTP authentication mechanisms are needed to enhance security and expand circumstances in which OTP authentication can be applied. Further, the context in which transactions are occurring (e.g., the payment amount, location, time of day, etc.) should be considered when generating OTP credentials.

Aspects of the present disclosure relate to gesture-based OTP authentication for transactions. Initiation of a transaction can be detected. Contextual information associated with the transaction can be received. In response to detecting the initiation of the transaction and based on the contextual information associated with the transaction, a one-time password (OTP) comprising one or more gestures to be performed by a user can be generated. The one or more gestures to be performed can be displayed on an extended reality (XR) device worn by the user. In response to validating user performance of the one or more gestures displayed via the XR device, the transaction can be authorized.

Aspects of the present disclosure provide various improvements. Gesture-based OTP authentication enhances security, as only the user will have knowledge of the gestures they will be required to complete. Gesture-based OTPs are not as simple or predictable as OTPs including text, codes, and/or shield/security questions. This expands the situations in which OTPs can be applied. Further, by generating OTP credentials based on contextual data of the user and/or the transaction, security of the OTP can be tuned based on the environment of the transaction and characteristics of the user. Thus, requiring simpler authentication (e.g., requiring the user to perform a single, simple, gesture) can be completed in situations where a user is not likely to require higher security (e.g., when the user is at their residence). Conversely, requiring complicated authentication (e.g., requiring the user to perform multiple, complex, gestures) can be completed in situations where the user is likely to require higher security (e.g., when the user is in a public place).

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera), and/or any commercially available or custom software (e.g., browser software, communications software, server software, natural language processing software, search engine and/or web crawling software, image processing software, extended reality (XR) software, etc.). The devices 105 and/or the server 135 can be servers, desktops, laptops, financial transaction terminals, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a gesture-based one-time password (OTP) management application 160. The gesture-based OTP management application 160 can be configured to authenticate a user upon detection of a transaction (e.g., a contactless payment transaction). Upon authentication, the user can be authorized to complete the transaction.

The gesture-based one-time password (OTP) management application 160 can be configured to detect an initiation of a transaction. The transaction can be a request to access a website, an account, a payment transaction (e.g., a banking account), or another resource. In embodiments, upon initiation of the transaction by a user device (e.g., device 105-1), a notification of the transaction initiation is transmitted to the server 135. Thereafter, the gesture-based OTP management application 160 can be configured to authenticate the user to facilitate access to the transaction.

Responsive to detection of the initiation of the transaction, the gesture-based OTP management application 160 can be configured to generate an OTP comprising (e.g., in the form of) one or more gestures to be performed by the user. As discussed herein, a "one-time password" refers to a password, pin, or other login credential required to access a single transaction. That is, an OTP may only be valid for a single use. In embodiments, OTPs generated by the gesture-based OTP management application 160 can be re-used in future transactions. However, the OTP currently presented to the user may only be valid for the transaction they are currently completing. As discussed herein, a "gesture" refers to a motion, position, orientation, pose, hand-sign, facial expression, or any other three-dimensional position/movement of a user. As such, an "OTP in the form of one or more gestures" refers to three-dimensional positions and/or movements integrated into login-credentials the user is required to perform to be granted access to the transaction they are executing.

In embodiments, the OTP in the form of one or more gestures can be generated based on contextual data associated with the transaction and/or user. For example, a number of gestures to be performed and a selection of gestures to be performed (e.g., based on complexity) by the user can depend on the contextual conditions in which the transaction is occurring. Contextual conditions which can be used to dictate the number and type of gesture-based OTPs to be presented to a user include the current time of day, day of week, the type of transaction (e.g., login to a website account versus a payment transaction), the location of the transaction, biometric data (e.g., heart rate or other biometric indicators) of the user, mood (e.g., determined via mood detection) of the user, and security requirements of the transaction (e.g., a high payment to be authorized versus a low payment to be authorized). That is, a number of gestures the user is required to perform and a selection of gestures the user is required to perform can depend on the context of the transaction and/or user. For example, a transaction for a contactless payment for a low amount may require a single gesture (e.g., a thumbs up) for the transaction to be authorized, whereas a transaction for a contactless payment for a high amount may require the user to perform multiple complex gestures (e.g., the user may be required to perform various poses, motions, hand-signs, etc. in order to be granted access).

The OTP in the form of one or more gestures is then presented to the user (e.g., the server 135 transmits a command is to display the one or more gestures on a device associated with the user). In embodiments, the OTP in the form of one or more gestures can be presented to the user on an extended reality (XR) device (e.g., a virtual reality (VR) or augmented reality (AR) capable device). For example, the OTP in the form of one or more gestures can be presented on a head-mounted display (HMD) (e.g., AR glasses or a VR headset) worn by a user. This can allow the user to view the gesture(s) that are required to be performed for authentication (in confidence) on the XR device such that the user can recreate the gesture(s) depicted on the XR device. This is also particularly useful for XR devices, where conventional input mechanisms (e.g., keyboard inputs) may be limited. However, in embodiments, the OTP in the form of one or more gestures may be presented on a mobile device, laptop, financial terminal, or other device associated with the user and/or transaction.

The gesture-based OTP management application 160 then receives authentication data from the user. The authentication data includes the gesture(s) performed by the user in an attempt to authenticate the transaction. In embodiments, the performance of the OTP in the form of one or more gestures can be captured by one or more sensors in the environment of the transaction. For example, optical sensors (e.g., cameras, radars, or other light-based sensors) can capture the user performance of the gestures required by the OTP such that they can be compared and validated to the OTP. As another example, attached sensors (e.g., sensors attached, grasped, or otherwise coupled to the user), such as accelerometers and positional sensors, can be configured to track the position/movement of the user such that the gestures performed by the user can be compared to the OTP. However, any suitable number and/or type of sensors can be configured to capture user performance of gestures as authentication data. Ultimately, the authentication data (e.g., sensor data) capturing the user performance of the one or more gestures specified by the OTP can be compared to stored metrics indicating expected results (e.g., reference sensor data) associated with the OTP in the form of one or more gestures to determine whether to authorize the transaction the user is executing.

The gesture-based OTP management application 160 then compares the authentication data received from the user with the OTP in the form of one or more gestures to determine whether the user is authorized. In embodiments, if a sufficient match is determined (e.g., a match percentage threshold is satisfied), the transaction can be authorized. In embodiments, if a sufficient match is not determined (e.g., a match percentage threshold is not satisfied), the transaction can be denied.

In embodiments where the authentication data is in the form of image data, image comparison can be performed between the image data within the authentication data and the image data associated with the OTP in the form of one or more gestures. For example, a video and/or set of images of the user performing the gesture(s) can be compared to reference images (e.g., template or control images) depicting the appropriate gesture to be performed. In embodiments, a machine learning model (e.g., a neural network) can be trained to determine the match between images within the authentication data received from the user and the images associated with the OTP in the form of one or more gestures.

In embodiments where authentication data is in the form of attached sensor data (e.g., positional and accelerometer based sensor data capturing user movements/positions), the positional/movement data within the authentication data can be compared with template positional/movement data (e.g., control positional/movement data) associated with the OTP in the form of one or more gestures. For example, a match can be determined based on the relative position/movements of various body parts of a user as captured within authentication data and projected/expected positions/movements of body parts associated with the OTP in the form of one or more gestures.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Though this disclosure pertains to the collection of personal data (e.g., sensor data capturing user gestures, contextual information associated with a user/transaction, etc.), it is noted that in embodiments, users opt-in to the system (e.g., the gesture-based OTP management application 160). In doing so, they are informed of what data is collected and how it will be used, that any collected personal data may be encrypted while being used, that users can opt-out at any time, and that if they opt-out, any personal data of the user is deleted.

Figure 2:
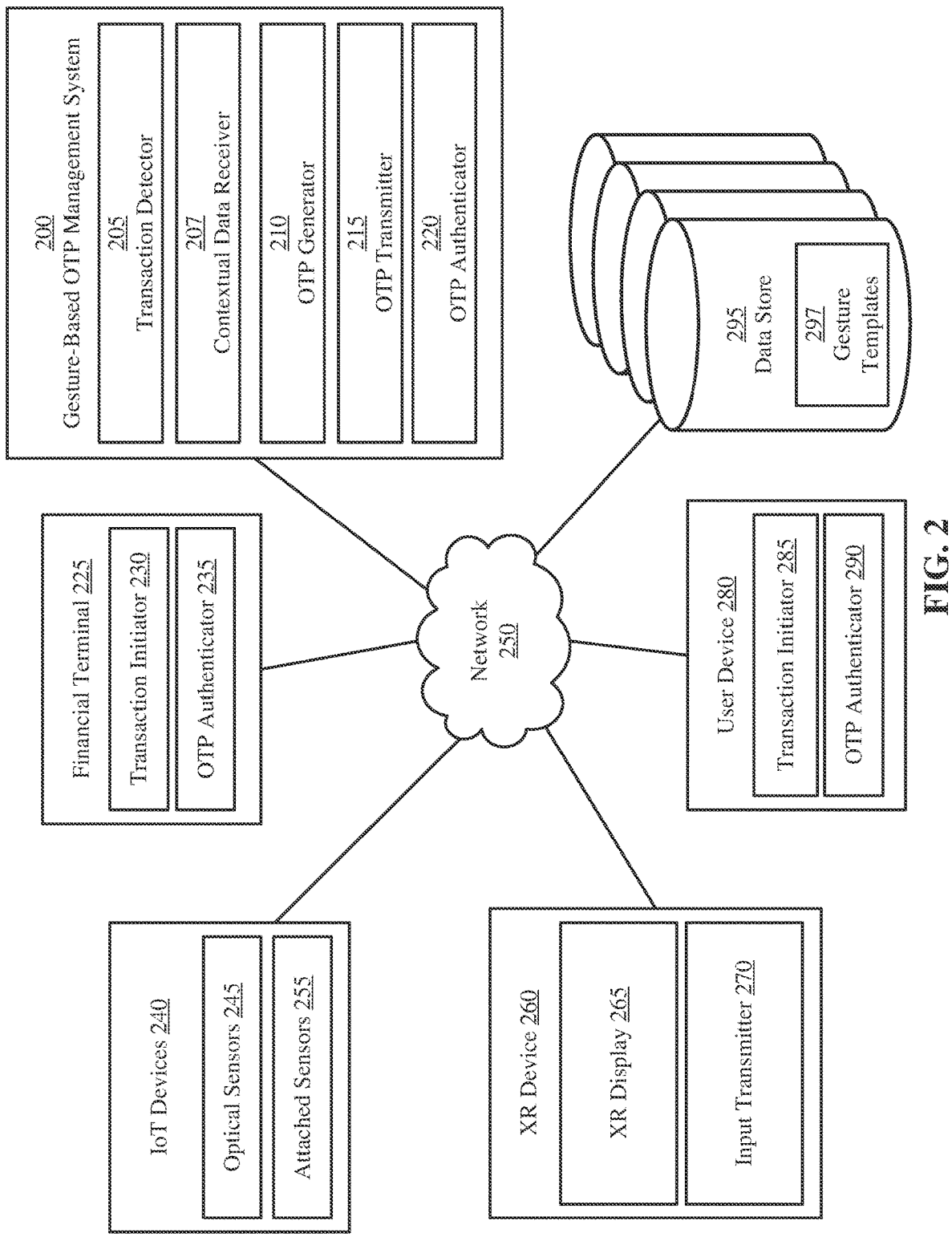
FIG. 2 is a block diagram illustrating an IoT environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a gesture-based one-time password (OTP) management system 200, a financial terminal 225, IoT devices 240, an XR device 260, a user device 280, and a data store 295. The various components within the IoT environment can be processor executable instructions that can be executed by a dedicated or shared processor using received inputs.

The gesture-based OTP management system 200 can be configured to detect the initiation of a transaction and authenticate a user associated with the transaction to authorize the transaction using a gesture-based OTP. The gesture-based OTP management system 200 includes a transaction detector 205, a contextual data receiver 207, an OTP generator 210, an OTP transmitter 215, and an OTP authenticator 220. The transaction detector 205, contextual data receiver 207, OTP generator 210, OTP transmitter 215, and OTP authenticator 220 can be processor executable instructions that can be executed by a dedicated or shared processor using received inputs.

The transaction detector 205 of the gesture-based OTP management system 200 can be configured to detect the initiation of a transaction. The transaction can be a user request to access a computing resource, such as a user account, a website, or a financial payment account. As an example, if a user initiates payment on a financial terminal 225, a transaction initiator 230 of the financial terminal 225 can be configured to transmit a signal to the gesture-based OTP management system 200 indicating that the user initiated a payment transaction and thus authentication is required for authorization of the payment transaction. Similarly, if a user initiated a transaction on their user device 280, then a transaction initiator 285 of the user device 280 can be configured to transmit a signal to the gesture-based OTP management system 200 indicating that the user initiated the payment transaction and thus authentication is required for authorization of the payment transaction. Indications of transactions occurring can be transmitted to the gesture-based OTP management system 200 on a push or pull basis.

The contextual data receiver 207 of the gesture-based OTP management system 200 can be configured to receive contextual information associated with the initiated transaction. Contextual information associated with a transaction that may be collected includes time data (e.g., time of day, day of week, etc.), location data, transaction type (e.g., a payment versus an account login), transaction information (e.g., selected payment information, a payment amount, etc.), user biometrics (e.g., user heart rate and blood glucose levels), and user mood, among other information. The contextual data received by the contextual data receiver 207 can dictate the number and selection of gestures to be integrated into OTPs.

By way of example, a user may initiate payment on the financial terminal 225 using a near-field communication (NFC) wireless link with their user device 280. The pairing between the mobile device 280 and financial terminal 225 may serve as an indication that a payment transaction is occurring. The user can then select a digital wallet (e.g., saved payment information) on their user device 280, and contextual information associated with the transaction (e.g., the payment amount, payment location, time of day, user characteristics, selected payment information, etc.) can be transmitted to the gesture-based OTP management system 200. The gesture-based OTP management system 200 can then detect the transaction, receive contextual information associated with the transaction, and responsively generate an OTP in the form of one or more gestures to be performed by the user in order to authorize the transaction.

The OTP generator 210 can be configured to generate OTPs in the form of one or more gestures as credentials required to be validated prior to authorizing transactions. OTPs can be generated in response to the detection of a transaction and receipt of contextual information associated with the transaction. User performance of the one or more gestures defined in the OTP can be validated to authenticate the user (e.g., by ensuring the user has knowledge of the presented gesture(s)), thus enabling authorization of the transaction.

The gestures integrated into OTPs can be stored as gesture templates 297 within data store 295. In embodiments, the gesture templates 297 include a set of gestures and corresponding reference sensor data (e.g., optical, position, and/or movement sensor data) associated with performing each respective gesture. Thus, upon user performance of gesture(s) defined within a presented OTP, the reference sensor data associated with the gestures included in the OTP can be referenced in the gesture templates 297 for validation purposes.

In embodiments, each gesture within gesture templates 297 can have a pre-assigned complexity rating (e.g., a value indicative of gesture complexity, where a higher magnitude of the complexity value indicates a higher gesture complexity). In embodiments, the complexity rating of each gesture can be pre-defined (e.g., automatically via machine learning or manually by a user). For example, a relatively simple gesture (e.g., a static hand signal) may be assigned a complexity rating of 1, whereas a relatively complex gesture (e.g., a gesture requiring multiple moving body parts, such as a dance) may be assigned a complexity rating of 10. In this example, the complexity rating scale may span from 1 (simplest) to 10 (most complex), with each integer between 1 and 10 being a gesture complexity magnitude classification. However, any suitable gesture complexity scale and/or gesture complexity magnitude classifications can be defined without departing from the spirit and scope of the present disclosure. The complexity of gestures within gesture templates can be used as selection criterion based on contextual data associated with transactions.

In embodiments, a number and selection of gestures from gesture templates 297 to integrate into an OTP for a given transaction depends on the contextual data received by the contextual data receiver 207. For example, upon receipt of contextual information associated with the user and/or transaction, the contextual information can be analyzed to determine the number and type of gesture included in gesture templates 297 to integrate into an OTP. In embodiments, the gesture included in the OTP can consider historical gestures presented to the same user (e.g., to ensure gestures are properly rotated and/or to ensure gestures the user can adequately perform are presented to the user in the future).

Reference will now be made to various contextual conditions which may impact the number and selection of gesture to integrate into OTPs by the gesture-based OTP management system.

In embodiments, time information, such as time of day, day of week, season, month, year, etc. can be considered when selecting gesture(s) to integrate into an OTP in response to detecting a transaction. For example, an OTP to be presented to a user during a first time window (e.g., 8 AM-5 PM) may require lesser/simpler gestures than an OTP to be presented to the user during a second time window (e.g., 5 PM-8 AM). Thus, upon detection of a transaction, the OTP generator 210 can be configured to analyze the current time to determine which time range applies. Thereafter, the number and selection of gestures (e.g., based on gesture complexity values) to integrate into the OTP can be determined based on the time range the transaction falls into. In this example, if the OTP generator 210 determines that it is 2 PM, a single, simple (e.g., a gesture complexity value of 1), gesture may be retrieved from gesture templates 297 and integrated into an OTP. However, aspects of the present disclosure recognize a variety of time-based contextual conditions can be mapped to a variety of decisions regarding the number and selection of gesture to integrate into an OTP.

In embodiments, location information, such as global positioning system (GPS) data, indoor positioning system (IPS) data, or other location data can be considered when selecting gesture(s) to integrate into an OTP in response to detecting a transaction. For example, an OTP to be presented to a user at a first location (e.g., their residence) may require lesser/simpler gestures than an OTP to be presented to the user at a second location (e.g., a public store). Thus, upon detection of a transaction, the OTP generator 210 can be configured to analyze the location of the transaction. Thereafter, the number and selection of gestures (e.g., based on gesture complexity values) to integrate into the OTP can be determined based on the determined location. In this example, if the OTP generator 210 determines that the user is at their residence, a single, simple (e.g., a gesture complexity value of 1), gesture may be retrieved from gesture templates 297 and integrated into an OTP. Conversely, if the OTP generator determines that the user is at a public store, multiple, complex (e.g., gesture complexity values between 5-10), gestures may be retrieved from gesture templates 297 and integrated into an OTP. However, aspects of the present disclosure recognize a variety of location-based contextual conditions can be mapped to variety of decisions regarding the number and selection of gesture to integrate into an OTP.

In embodiments, transaction type, such as whether the transaction is a routine account login (e.g., login to a social media account) or whether the transaction is for a payment (e.g., access to a financial account), can be considered when selecting gesture(s) to integrate into an OTP in response to detecting a transaction. For example, an OTP to be presented to a user during a first transaction type (e.g., a login to a social media account) may require lesser/simpler gestures than an OTP to be presented to the user during a second transaction type (e.g., a transaction requiring access to a financial account). Thus, upon detection of a transaction, the OTP generator 210 can be configured to analyze the type of the transaction. Thereafter, the number and selection of gestures (e.g., based on gesture complexity values) to integrate into the OTP can be determined based on the determined transaction type. In this example, if the OTP generator 210 determines that the transaction includes login to a social media account, a single, simple (e.g., a gesture complexity value of 1), gesture may be retrieved from gesture templates 297 and integrated into an OTP. Conversely, if the OTP generator determines that the transaction requires access to the user's bank account, multiple, complex (e.g., gesture complexity magnitude values between 5-10), gestures may be retrieved from gesture templates 297 and integrated into an OTP. However, aspects of the present disclosure recognize a variety of transaction type contextual conditions can be mapped to variety of decisions regarding the number and selection of gesture to integrate into an OTP.

In embodiments, transaction information, such as transaction payment type (e.g., a selected payment account), transaction payment amount, and/or specific transaction account logins (e.g., a social media account login versus an email account login) can be considered when selecting gesture(s) to integrate into an OTP in response to detecting a transaction. For example, an OTP to be presented to a user for a first transaction payment amount (e.g., a low payment amount, such as $5) may require fewer/simpler gestures than an OTP to be presented to the user for a second transaction payment amount (e.g., a high payment amount, such as $100). Thus, upon detection of a transaction, the OTP generator 210 can be configured to analyze the transaction information such as the transaction payment amount. Thereafter, the number and selection of gestures (e.g., based on gesture complexity values) to integrate into the OTP can be determined based on the transaction information. In the example referenced above, if the OTP generator 210 determines that the transaction is for a low amount, a single, simple (e.g., a gesture complexity value of 1), gesture may be retrieved from gesture templates 297 and integrated into an OTP. Conversely, if the OTP generator determines that the transaction is for a high amount, multiple, complex (e.g., gesture complexity magnitude values between 5-10), gestures may be retrieved from gesture templates 297 and integrated into an OTP. However, aspects of the present disclosure recognize a variety of transaction information contextual conditions can be mapped to variety of decisions regarding the number and selection of gesture to integrate into an OTP.

In embodiments, context of the user during the transaction can be considered when selecting gesture(s) to integrate into an OTP in response to detecting a transaction. For example, the mood of the user (e.g., determined via Watson® Tone Analyzer, facial expression detection, or other sentiment analysis algorithms) and/or biometrics of the user (e.g., heart rate and/or glucose level determined using wearable devices) can be considered when selecting gesture(s) to integrate into an OTP in response to detecting a transaction. As an example, an OTP to be presented to a user when the user is determined to be in a first mood state (e.g., stressed) may require lesser/simpler gestures than an OTP to be presented to the user when the user is in a second mood state (e.g., relaxed). As another example, an OTP to be presented to a user when the user is determined to be in a first biometric state (e.g., a heart rate between the range of 50-100 beats per minute (BPM)) may require lesser/simpler gestures than an OTP to be presented to the user when the user is in a second biometric state (e.g., a heart rate between 100-150 BPM). Thus, upon detection of a transaction, the OTP generator 210 can be configured to analyze the context of the user (e.g., the mood and biometric state of the user). Thereafter, the number and selection of gestures (e.g., based on gesture complexity values) to integrate into the OTP can be determined based on the context of the user. In the first example referenced above, if the OTP generator 210 determines that the user is in the first mood state, a single, simple (e.g., a gesture complexity value of 1), gesture may be retrieved from gesture templates 297 and integrated into an OTP. Conversely, in the first example referenced above, if the OTP generator determines that the user is in the second mood state, multiple, complex (e.g., gesture complexity magnitude values between 5-10), gestures may be retrieved from gesture templates 297 and integrated into an OTP. However, aspects of the present disclosure recognize a variety of user contextual conditions (e.g., based on emotional/mood/biometric states) can be mapped to variety of decisions regarding the number and selection of gesture to integrate into an OTP.

Responsive to the detection of the transaction and based on the contextual conditions associated with the user and/or transaction, the OTP generator 210 generates an OTP in the form of one or more gestures (retrieved from gesture templates 297) to be performed by the user.

The OTP transmitter 215 of the gesture-based OTP management system 200 can be configured to transmit the OTP in the form of one or more gestures to an extended reality (XR) device 260 worn by a user. The XR device 260 can be a virtual reality, augmented reality, or mixed reality device capable of generating near real-life, abstract, surreal, and/or realistic images, sounds, and/or other human discernable sensations that simulate a user's physical presence in a virtual environment as presented on an XR display 265. The user can view the gesture(s) included in the OTP (e.g., the 3 dimensional positions, motions, expressions, etc. of the gestures) on the XR display 265 such that the user can attempted to recreate (e.g., imitate or perform) the gestures for validation purposes. In embodiments, the XR display 265 may be hidden, obfuscated, or otherwise blocked from third party viewing. This can enhance security of embodiments of the present disclosure, as third parties may not be able to view the gestures required to unlock the transaction.

Though reference is made to displaying the OTP in the form of one or more gestures on XR device 260, in embodiments, the OTP transmitter 215 can be configured to transmit a command to display the OTP comprising one or more gestures on any other device associated with a user. That is, in embodiments, the OTP transmitter 215 can transmit the OTP in the form of one or more gestures to another device, such as user device 280 or financial terminal 225.

In embodiments, an input transmitter 270 of the XR device 260 can be configured to provide user input regarding the OTP to the gesture-based management system 200. For example, the user can provide feedback about the gestures they were required to perform to aid in selecting/presenting future gestures within OTPs. As an example, if a user provides negative feedback regarding a first gesture integrated into an OTP, the first gesture may not be selected in the future when generating OTPs for the user. As another example, if the user provides positive feedback regarding a second gesture integrated into an OTP, the second gesture may be preferred over other gestures within gesture templates 297 when generating OTPs for the user in the future. In embodiments, the feedback received from the user (e.g., negative or positive feedback) can be provided to a machine learning algorithm configured to modify selection criteria for incorporating gestures to into OTPs.

The user can then perform the gestures indicated within the OTP (e.g., as displayed on XR device 260). User performance of the gestures in the OTP can be captured by IoT devices 240 or other sensor devices capable of capturing the user's 3-dimensional positions/movements. As depicted in FIG. 2, and by way of example, IoT devices 240 can include optical sensors 245 and attached sensors 255. The optical sensors 245 can be light-based sensors, such as cameras, infrared sensors, radars, and lidars. The optical sensors can capture the appearance of the user (i.e., the 3-dimensional position/orientation of the user, expressions of the user, motion of the user) over time. The attached sensors 255 can be positional/movement based sensors that can be attached, grasped, or otherwise physically coupled to a user to track the user's movements over time. For example, attached sensors can include controllers held by a user, positional sensors attached to a user's body parts (e.g., positional sensors attached to a user's arms or legs), a head-mounted display HMD of the XR device 260 (e.g., tracking the position of the user's head), etc. The attached sensors can include magnetometers, gyroscopes, accelerometers, indoor positioning system (IPS) technology, and other components configured to track changes in a user's position/movement. Ultimately, the optical and attached sensors 245, 255 track the relative movements/position of the user over time. Though reference is made to using optical and attached sensors 245 and 255, aspects of the present disclosure recognize that any other suitable type of sensor (e.g., an ultrasonic sensor) can be implemented to track the user's appearance, position, and movements over time without departing from the spirit and scope of the present disclosure.

In embodiments, the user can be calibrated upon opting into the gesture-based management system 200. This can ensure that physical dimensions of the user (e.g., the user's height) are considered when tracking their movement and validating the gestures they perform. In embodiments, reference sensor values for comparison/validation can be updated/modified based on a user's physical dimensions (e.g., reference sensor values may be modified based on height or other characteristics).

The OTP authenticator 220 then initiates authentication of the user by validating whether the user adequately performed the gestures indicated in the OTP. This can be completed by matching sensor data captured by IoT devices 240 (e.g., authentication data) to reference sensor data stored within gesture templates 297. For example, if optical sensors are relied upon for tracking the user performed gesture(s), image data captured during performance (e.g., over the authentication duration) of the gesture(s) can be compared to image data associated with gesture templates 297 for the corresponding selected gesture(s) of the OTP. Similarly, if attached sensors are relied upon for tracking the user performed gesture(s), positional/movement data over the authentication duration can be compared to positional/movement data associated with gesture templates 297 for the corresponding selected gesture(s) of the OTP.

In embodiments, validating the user performed gesture can include determining whether there is a sufficient match between the performed gesture and the gesture of the OTP. Determining whether a match is sufficient can include comparison to one or more thresholds. For example, one or more thresholds for image comparison (e.g., pixel matching, determined angles/orientations of gestures as compared to expected results, etc.) or positional/movement data comparison (e.g., coordinate comparison in a 3-dimensional space) can be implemented. The OTP authenticator 220 can be configured to transmit an authentication signal authorizing the transaction to an OTP authenticator 235 of the financial terminal 225 or an OTP authenticator 290 of the user device 280. If the OTP authenticator 220 transmits a signal authenticating the user, then the user transaction can be authorized. If the OTP authenticator 220 transmits a signal indicating the user is not authenticated, then the user transaction can be denied.

Though reference is made to analysis (e.g., comparison between performed gestures and gestures within an OTP) by the gesture-based OTP management system 200, in embodiments, analysis can be performed by other devices in the IoT environment. For example, the financial terminal 225, user device 280, and/or XR device 260 can be configured to receive authentication data (e.g., sensor data capturing user performance of gestures) and compare the authentication data with reference sensor data within data store 295 for authentication purposes.

It is noted that FIG. 2 is intended to depict the representative major components of an example computing environment. In some embodiments, however, individual components can have greater or lesser complexity than as represented in FIG. 2, components other than or in addition to those shown in FIG. 2 can be present, and the number, type, and configuration of such components can vary.

Figure 3:
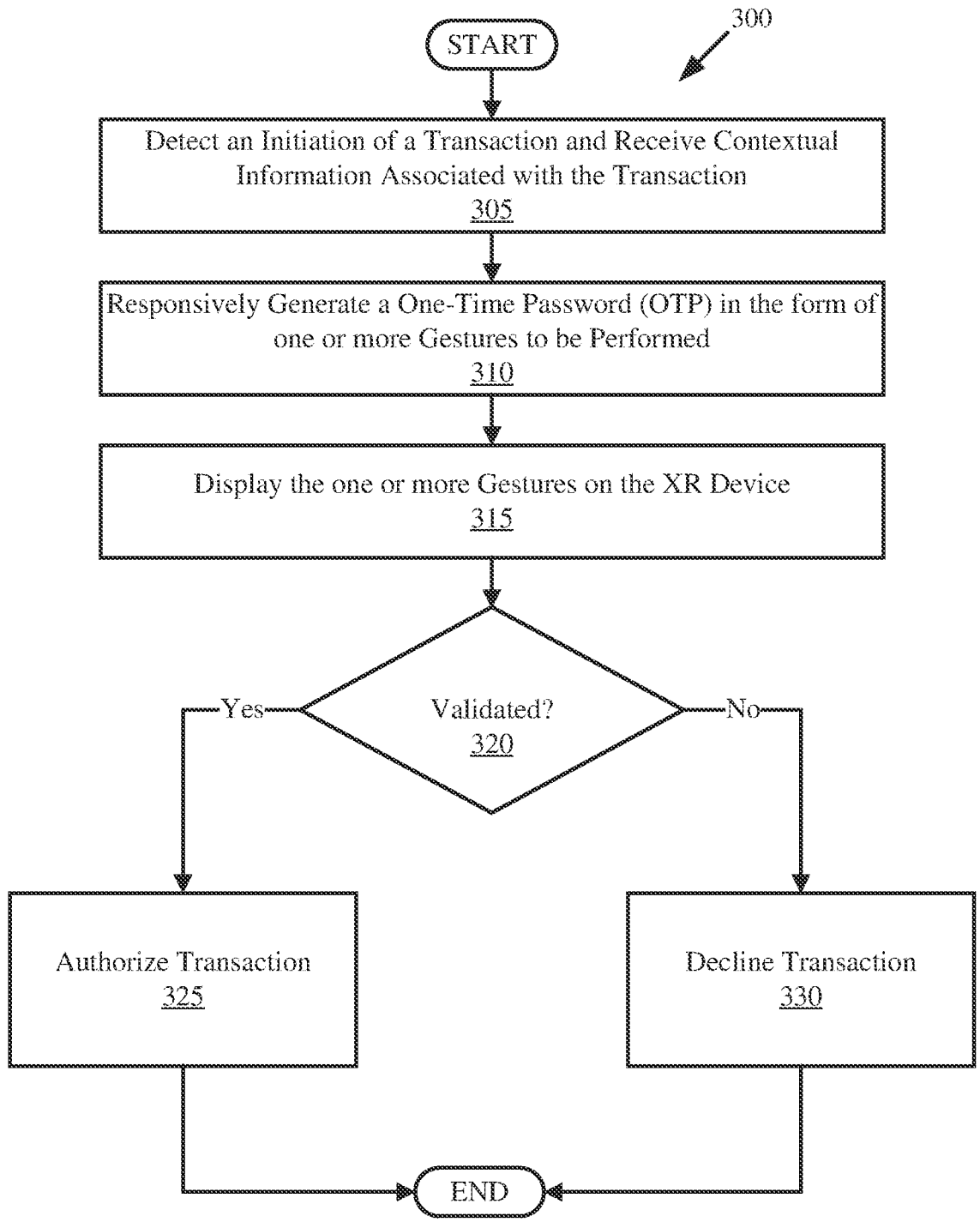
FIG. 3 is a flow-diagram illustrating an example method for gesture-based OTP generation and authentication, in accordance with embodiments of the present disclosure.

Referring now to FIG. 3, shown is a flow-diagram illustrating an example method 300 for gesture-based one-time password (OTP) generation and authentication, in accordance with embodiments of the present disclosure. One or more operations of method 300 can be completed by one or more computing devices (e.g., devices 105, server 135, gesture-based OTP management system 200, financial terminal 225, IoT devices 240, XR device 260, user device 280).

Method 300 initiates at operation 305, where an initiation of a transaction is detected and where contextual information associated with the transaction is received. Operation 305 can be completed in the same, or a substantially similar manner, as described with respect to transaction detector 205 and contextual data receiver 207 of FIG. 2. For example, a financial terminal or user device can be configured to transmit a notification of an initiated transaction to a server (e.g., gesture-based OTP management system 200). The contextual data can be collected using a variety of sensors and/or devices associated with the user/transaction.

An OTP in the form of one or more gestures to be performed by the user can be generated. This is illustrated at operation 310. Operation 310 can be completed in the same, or a substantially similar manner, as described with respect to the OTP generator 210 of FIG. 2. In embodiments, the number and selection of gestures to include in the OTP depend on the collected contextual data. For example, the number and selection of gestures to include in the OTP can depend on time, location, transaction type, transaction information, and user context (e.g., a user's mood/biometrics).

The one or more gestures included in the OTP are then displayed on an extended reality (XR) device. This is illustrated at operation 315. For example, the 3-dimensional positions/motions required by the gestures can be displayed on an XR display of an XR device. In embodiments where multiple gestures are required to be performed by a user, the gestures can be displayed in series. For example, a first gesture can be displayed on the XR display, and upon user performance of the first gesture, a second gesture included in the OTP can be displayed on the XR display. This can be completed for any number of gestures included in an OTP.

A determination is made whether the user performance of the gesture(s) included in the OTP are validated. This is illustrated at operation 320. Validation of the user performance of the gesture(s) included in the OTP can be completed in the same, or a substantially similar manner, as described with respect to the OTP authenticator 220 of FIG. 2. For example, authentication data of the user (e.g., captured sensor data of the user performing gestures in the OTP) can be compared with stored reference sensor data associated with the required gesture(s). A sufficient match can be determined based on comparison to one or more thresholds.

If a determination is made that the user performance of the gesture(s) included in the OTP are validated, then method 300 proceeds to operation 325, where the transaction is authorized. If a determination is made that the user performance of the gesture(s) included in the OTP are not validated, then method 300 proceeds to operation 330, where the transaction is declined.

The aforementioned operations can be completed in any order and are not limited to those described. Additionally, some, all, or none of the aforementioned operations can be completed, while still remaining within the spirit and scope of the present disclosure.

Figure 4:
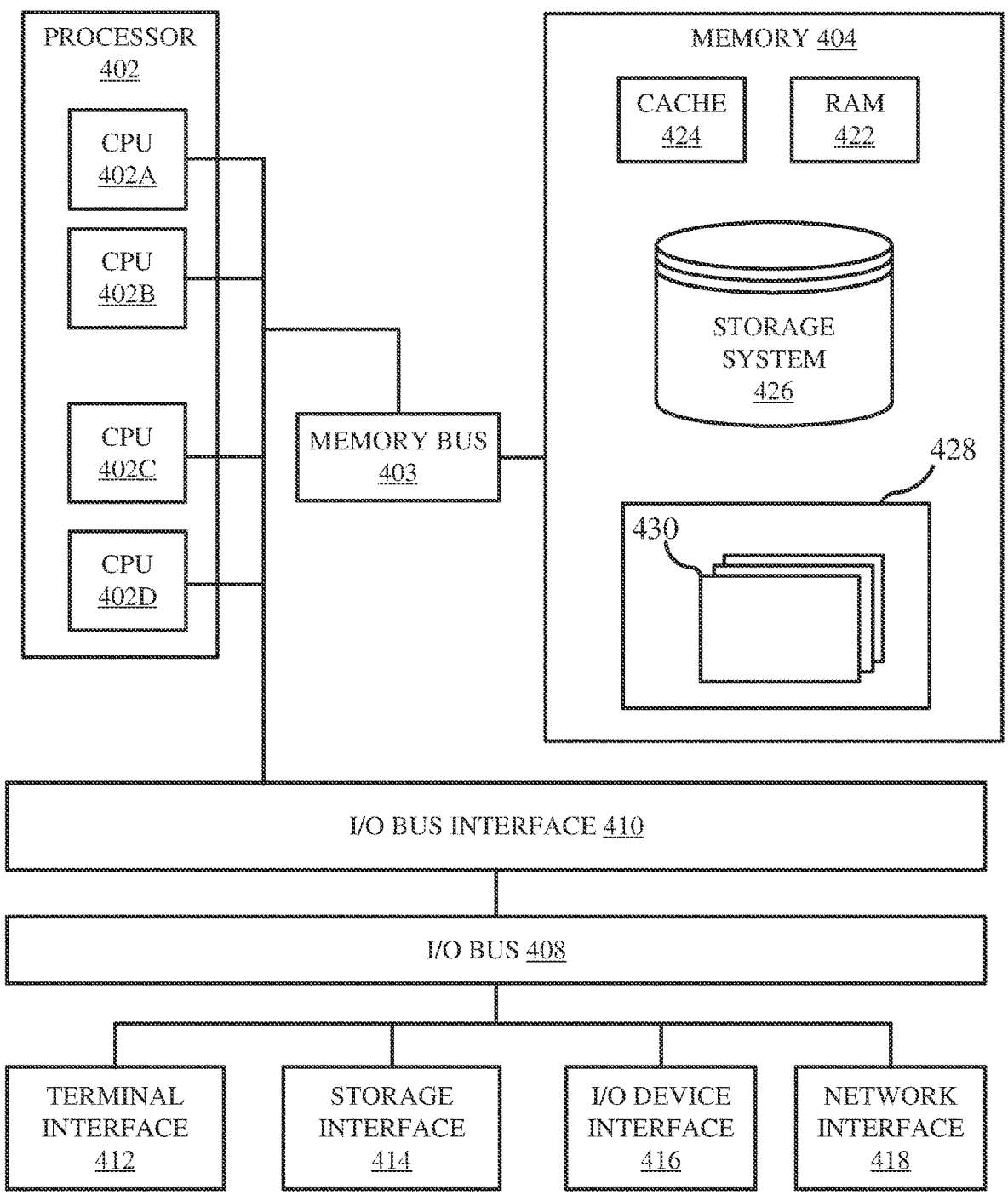
FIG. 4 is a high-level block diagram illustrating an example computer system that can be used in implementing one or more of the methods, tools, modules, and any related functions described herein, in accordance with embodiments of the present disclosure.

Referring now to FIG. 4, shown is a high-level block diagram of an example computer system 401 that may be utilized in various devices discussed herein (e.g., devices 105, server 135, gesture-based OTP management system 200, financial terminal 225, IoT devices 240, XR device 260, user device 280) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
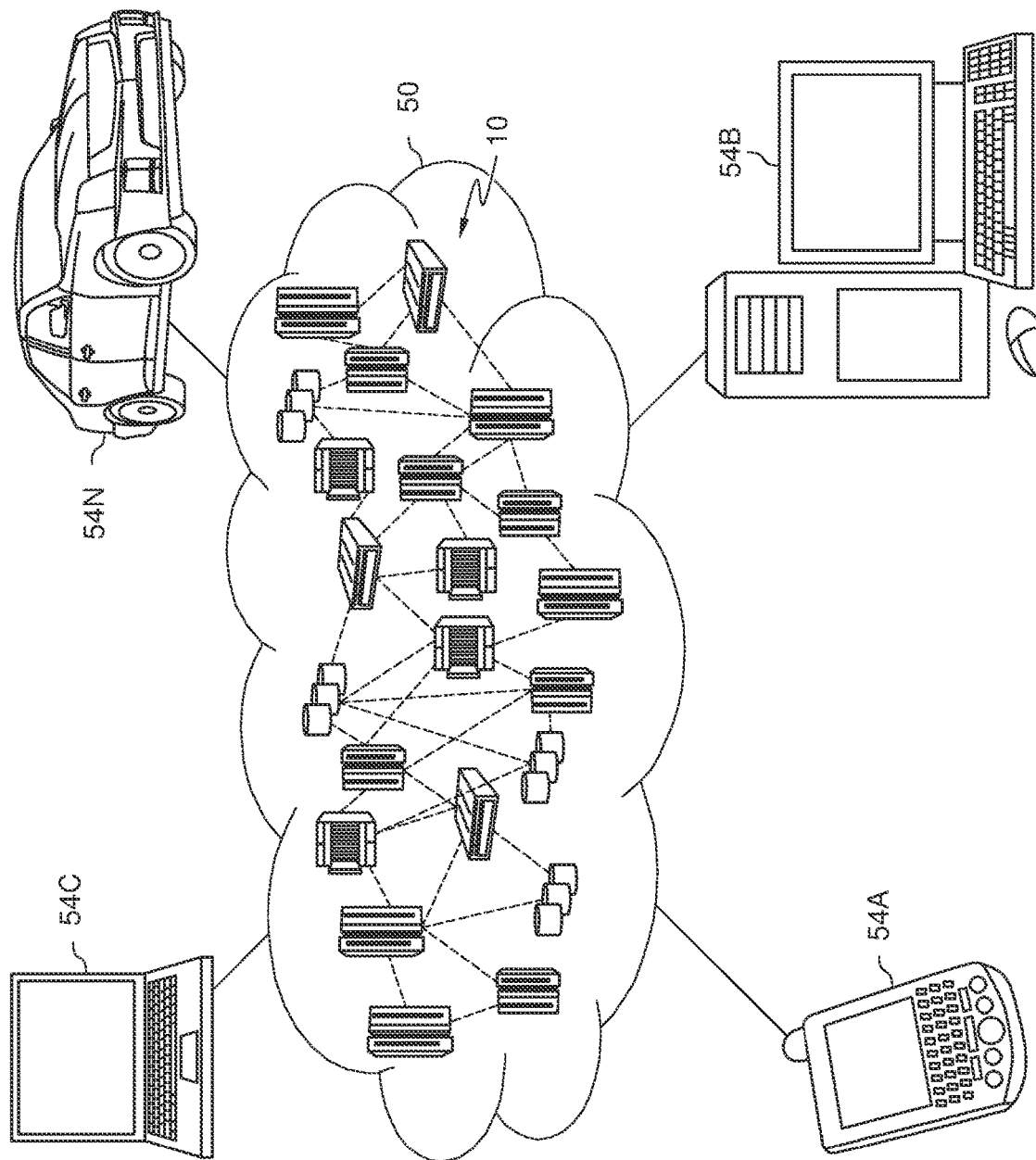
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
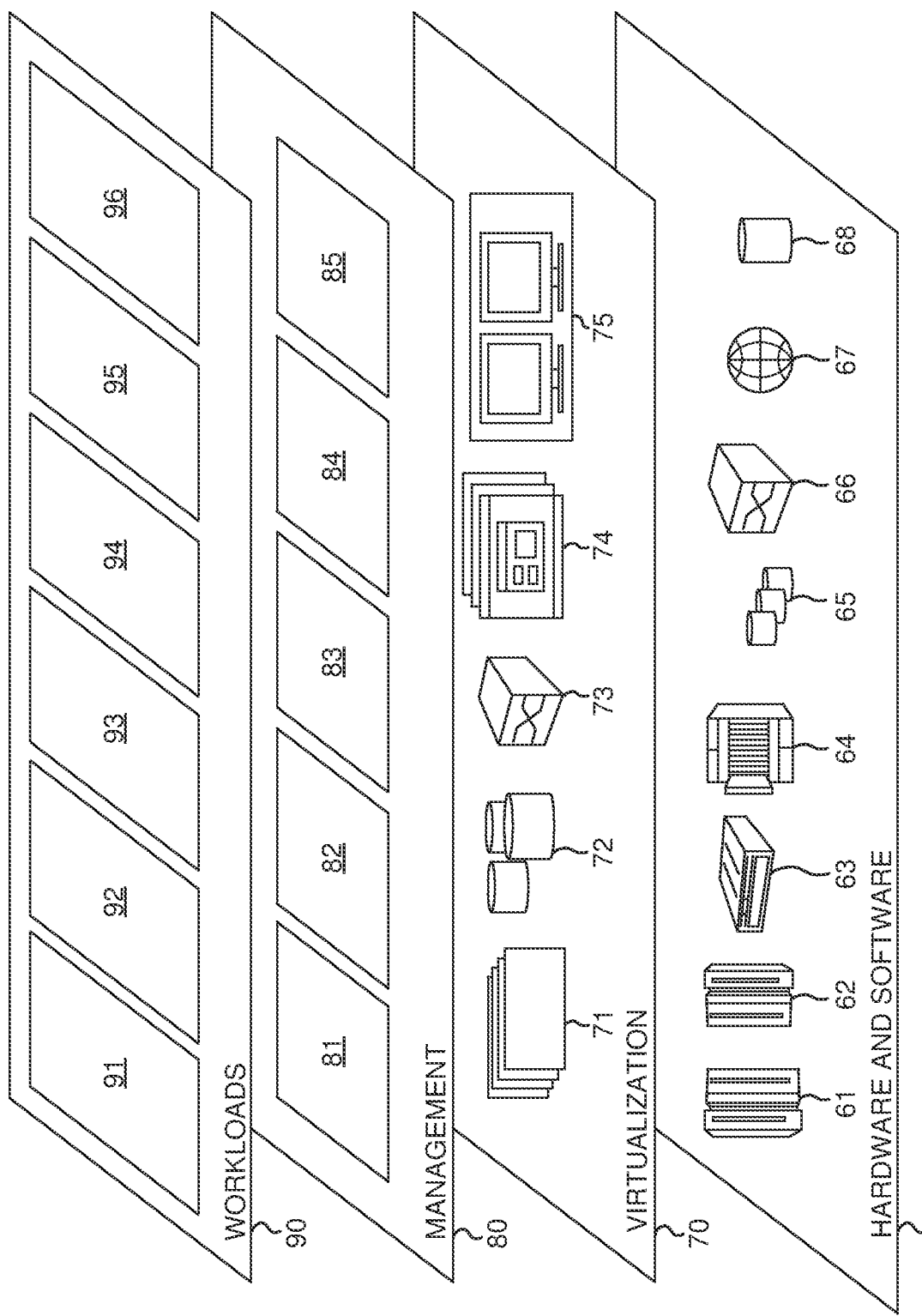
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and gesture-based OTP management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   detecting an initiation of a transaction;
   receiving contextual information associated with the transaction;
   generating, in response to detecting the initiation of the transaction and based on the contextual information associated with the transaction, a one-time password (OTP) comprising one or more gestures to be performed by a user;
   transmitting a command to display the one or more gestures to be performed on an extended reality (XR) device worn by the user; and
   authorizing, in response to validating user performance of the one or more gestures displayed via the XR device, the transaction.

2. The method of claim 1, wherein a number of gestures to be performed and a selection of a gesture to be performed are based on the contextual information associated with the transaction.

3. The method of claim 2, wherein the contextual information includes a transaction amount, a location of the transaction, and a time of the transaction.

4. The method of claim 2, wherein the contextual information includes a mood of the user.

5. The method of claim 2, wherein the contextual information includes biometrics of the user.

6. The method of claim 1, further comprising:
   detecting a second transaction;
   determining that the user is in a first location;
   generating a second OTP comprising two gestures to be performed by the user, wherein a complexity of each of the two gestures is based on the user being in the first location;

transmitting a command to display the two gestures to be performed by the user on the XR device; and
authorizing, in response to validating user performance of the two gestures, the second transaction.

7. The method of claim 1, further comprising:
detecting a second transaction;
determining that the second transaction is contactless payment transaction for a first amount;
generating a second OTP including a gesture to be performed by the user, wherein a complexity of the gesture is based on the first amount;
transmitting a command to display the gesture to be performed by the user on the XR device; and
authorizing, in response to validating user performance of the gesture, the second transaction.

8. A system comprising:
one or more processors; and
one or more computer-readable storage media collectively storing program instructions which, when executed by the one or more processors, are configured to cause the one or more processors to perform a method comprising:
detecting an initiation of a transaction;
receiving contextual information associated with the transaction;
generating, in response to detecting the initiation of the transaction and based on the contextual information associated with the transaction, a one-time password (OTP) comprising one or more gestures to be performed by a user;
transmitting a command to display the one or more gestures to be performed on an extended reality (XR) device worn by the user; and
authorizing, in response to validating user performance of the one or more gestures displayed via the XR device, the transaction.

9. The system of claim 8, wherein a number of gestures to be performed and a selection of a gesture to be performed are based on the contextual information associated with the transaction.

10. The system of claim 9, wherein the contextual information include a transaction amount, a location of the transaction, and a time of day of the transaction.

11. The system of claim 9, wherein the contextual information includes a mood of the user.

12. The method of claim 9, wherein the contextual information includes biometrics of the user.

13. The system of claim 8, wherein the method performed by the one or more processors further comprises:
detecting a second transaction;
determining that the user is in a first location;
generating a second OTP comprising two gestures to be performed by the user, wherein a complexity of each of the two gestures is based on the user being in the first location;
transmitting a command to display the two gestures to be performed by the user on the XR device; and
authorizing, in response to validating user performance of the two gestures, the second transaction.

14. The system of claim 8, wherein the method performed by the one or more processors further comprises:
detecting a second transaction;
determining that the second transaction is contactless payment transaction for a first amount;
generating a second OTP including a gesture to be performed by the user, wherein a complexity of the gesture is based on the first amount;
transmitting a command to display the gesture to be performed by the user on the XR device; and
authorizing, in response to validating user performance of the gesture, the second transaction.

15. A computer program product comprising one or more computer readable storage media, and program instructions collectively stored on the one or more computer readable storage media, the program instructions comprising instructions configured to cause one or more processors to perform a method comprising:
detecting an initiation of a transaction;
receiving contextual information associated with the transaction;
generating, in response to detecting the initiation of the transaction and based on the contextual information associated with the transaction, a one-time password (OTP) comprising one or more gestures to be performed by a user;
transmitting a command to display the one or more gestures to be performed on an extended reality (XR) device worn by the user; and
authorizing, in response to validating user performance of the one or more gestures displayed via the XR device, the transaction.

16. The computer program product of claim 15, wherein a number of gestures to be performed and a selection of a gesture to be performed are based on the contextual information associated with the transaction.

17. The computer program product of claim 16, wherein the contextual information includes a transaction amount, a location of the transaction, and a time of day of the transaction.

18. The computer program product of claim 16, wherein the contextual information includes biometrics of the user.

19. The computer program product of claim 15, wherein the method performed by the one or more processors further comprises:
detecting a second transaction;
determining that the user has a first mood;
generating a second OTP comprising two gestures to be performed by the user, wherein a complexity of each of the two gestures is based on the user being in the first mood;
transmitting a command to display the two gestures to be performed by the user on the XR device; and
authorizing, in response to validating user performance of the two gestures, the second transaction.

20. The computer program product of claim 15, wherein the method performed by the one or more processors further comprises:
detecting a second transaction;
determining that the second transaction is a first transaction type;
generating a second OTP including a gesture to be performed by the user, wherein a complexity of the gesture is based on the first transaction type;
transmitting a command to display the gesture to be performed by the user on the XR device; and
authorizing, in response to validating user performance of the gesture, the second transaction.

* * * * *